US012673309B2

(12) United States Patent      (10) Patent No.:   US 12,673,309 B2
Lowell et al.           (45) Date of Patent:      Jul. 7, 2026

(54) SYSTEMS FOR POLYMER FINES RECOVERY

(71) Applicant: Chevron Phillips Chemical Company LP, The Woodlands, TX (US)

(72) Inventors: Jeffrey S. Lowell, Conroe, TX (US); Kenneth A. Dooley, Porter, TX (US); Paul D. Meyer, Baytown, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 706 days.

(21) Appl. No.: 18/194,900

(22) Filed: Apr. 3, 2023

(65) Prior Publication Data

US 2024/0326003 A1     Oct. 3, 2024

(51) Int. Cl.
    *B01J 8/44*         (2006.01)
    *B01J 8/00*         (2006.01)
    *B01J 8/18*         (2006.01)

(52) U.S. Cl.
    CPC ................. *B01J 8/44* (2013.01); *B01J 8/004* (2013.01); *B01J 8/0055* (2013.01); *B01J 8/1872* (2013.01); *B01J 2219/187* (2013.01)

(58) Field of Classification Search
    CPC ... B01J 8/004; B01J 8/44; B01J 8/1872; B01J 8/388; B01J 8/0055; B01J 2208/00991; B01J 2208/00902; B01J 2208/00752
    See application file for complete search history.

(56) References Cited

U.S. PATENT DOCUMENTS

| | | | |
|---|---|---|---|
| 4,640,963 A | | 2/1987 | Kreider |
| 5,382,638 A | * | 1/1995 | Bontemps ................ B01J 8/006 |
| | | | 526/901 |
| 7,977,436 B2 | | 7/2011 | Scott |
| 8,198,384 B1 | | 6/2012 | Moore |
| 9,334,336 B2 | | 5/2016 | Hendrickson |
| 10,457,753 B2 | | 10/2019 | Lowell |
| 10,988,554 B2 | | 4/2021 | Lowell |
| 11,027,253 B2 | | 6/2021 | Price |

* cited by examiner

*Primary Examiner* — Lessanework Seifu
(74) *Attorney, Agent, or Firm* — Eversheds Sutherland (US) LLP

(57) ABSTRACT

A gas-phase polymerization system and a solids recovery system for a fluidized bed reactor. The fluidized bed reactor can include a fluidizing gas outlet from which a discharged mixture of fluidizing gas and polymer fines is released, and a cyclone separator can separate the polymer fines from the fluidizing gas for reentry into the fluidized bed reactor. It has been found that by situating the reactor entry nozzle of the fines return line which is closest to the gas-phase reaction zone significantly higher in the reaction zone than in a conventional fines return line, and by directionally orientating the incoming stream of polymer fines and carrier gas into the fluidized bed in the reaction zone, a significant increase in the residence time of the particle in the reaction and larger particles which meet a product size distribution specifications are achieved.

20 Claims, 3 Drawing Sheets

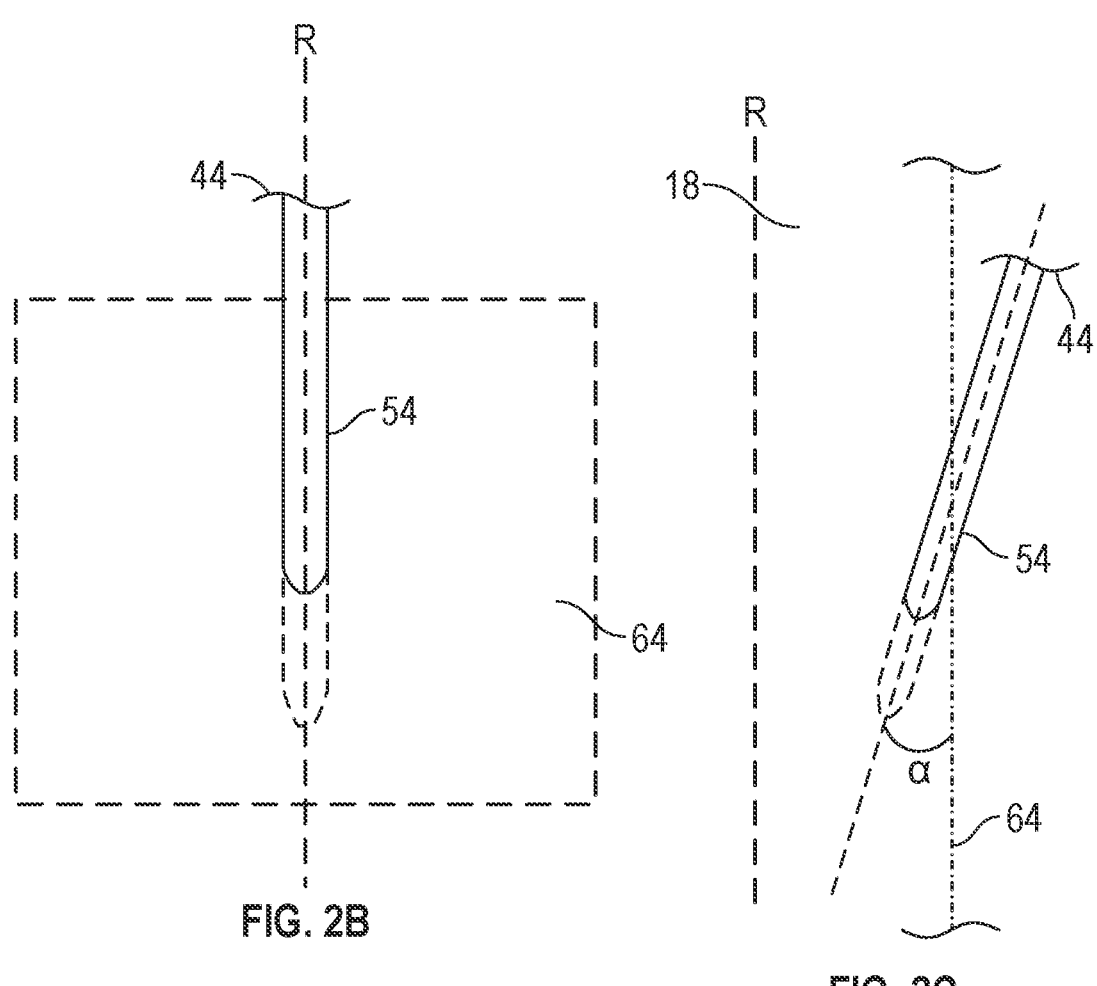
FIG. 2B
FIG. 2C
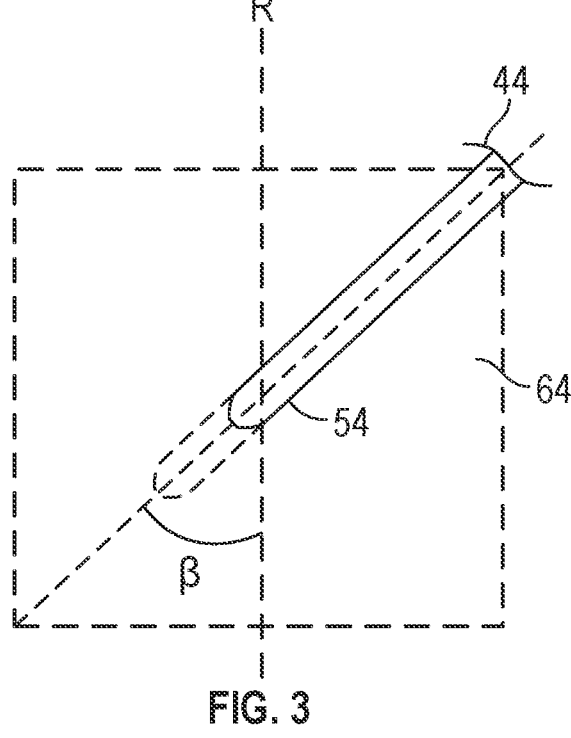
FIG. 3

SYSTEMS FOR POLYMER FINES RECOVERY

TECHNICAL FIELD

The present disclosure relates to systems for polymer fines recovery, and more specifically, systems for recovering and reinjecting polymer fines into a gas-phase polymerization reactor.

BACKGROUND

Gas-phase polymerization processes produce a gaseous stream exiting the gas-phase reactor that contains fine solid particles, unreacted olefins, and other gaseous and particulate components entrained therein. These fine solid particles are often referred to as polymer fines or simply "fines", and include growing polymer particles, formed and agglomerated polymer particles, flakes or spalling of larger particles within the reactor, and catalyst or pre-polymer particles. Fines exiting the reactor, for example, in a product stream, may be separated, captured and returned to the reactor for further reaction. Returned fines may eventually grow into larger particles conforming to a size distribution product specification, resulting in enhanced product yield and quality.

Accordingly, there is a need for processes and systems to efficiently recover and reintroduce polymer fines during polymer production in gas-phase polymerization reactors.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In an aspect, there is provided a solids recovery system for a gas-phase polymerization reactor. The solids recovery system may include a cyclone separator, venturi eductor, and a fines return line. The fines return line can include what is referred to herein as a reactor entry nozzle, which the part of the fines return line closest to the gas-phase reaction zone which is placed and oriented to direct the incoming fines and carrier gas for a specific placement within the gas-phase reactor. It has been found that placements of the reactor entry nozzle of the fines return line at certain heights within the reaction zone of the gas-phase reactor and certain directional orientations of the reactor entry nozzle which direct the fines into the reaction zone and into the fluidized bed can provide a significant increase in the reactor residence of the particle and allows the returned fines to grow into larger particles which meet a product size distribution specifications.

Accordingly, this disclosure provides for a gas-phase polymerization system, the system comprising:

a fluidized bed reactor comprising a reactor feed inlet and a fluidizing gas outlet;

a cyclone separator coupled to (and in fluid communication with) the fluidizing gas outlet and configured to receive a fluidizing gas comprising polymer fines and separate the polymer fines from the fluidizing gas;

a venturi eductor coupled between the cyclone separator and the fluidized bed reactor and configured to receive the separated polymer fines from the cyclone separator; and a fines return line coupling the venturi eductor to the fluidized bed reactor and configured to return the separated polymer fines from the venturi eductor to the fluidized bed reactor;

wherein the fluidized bed reactor further comprises a grid plate above the reactor feed inlet, a reaction zone above the grid plate, and a disengagement zone above the reaction zone and having a larger diameter than the reaction zone, and wherein the following conditions may be met:

(a) the fines return line has a reactor entry nozzle coupled to the fluidized bed reactor at a height above a top of the grid plate that is at least 50% of a height (H) of the fluidized bed measured from the top of the grid plate and a top of a fluidized bed; or (b) the reactor entry nozzle of the fines return line is coupled to the fluidized bed reactor at an angle alpha $(\alpha) \geq 5°$ relative to a vertical axis of the reaction zone; or (c) the reactor entry nozzle of the fines return line is coupled to the fluidized bed reactor at an angle beta $(\beta) \geq 5°$ relative to a vertical plane that includes a vertical axis of the fluidized bed reactor and an entry point of the reactor entry nozzle of the fines return line into the fluidized bed reactor; or (d) any combination of conditions (a), (b), and (c) are met.

This disclosure further provides a process for returning polymer fines to a gas-phase polymerization reactor, the process comprising:

polymerizing at least one olefin in a fluidizing gas in a reaction zone of a fluidized bed reactor;

providing the fluidizing gas comprising polymer fines from the fluidized bed reactor to a cyclone separator;

separating the polymer fines from the fluidizing gas in the cyclone separator;

drawing the polymer fines from the cyclone separator to a venturi eductor by supplying a motive gas to the venturi eductor and discharging the polymer fines with a motive gas; and supplying the polymer fines in a fines return mixture through a fines return line to the fluidized bed reactor;

wherein the fluidized bed reactor includes a reactor feed inlet, a grid plate above the reactor feed inlet, a reaction zone above the grid plate, and a disengagement zone above the reaction zone and having a larger diameter than the reaction zone, and wherein the following conditions may be met:

(a) the fines return line has a reactor entry nozzle coupled to the fluidized bed reactor at a height above a top of the grid plate that is at least 50% of a height (H) of the fluidized bed measured from the top of the grid plate and a top of a fluidized bed; or (b) the reactor entry nozzle of the fines return line is coupled to the fluidized bed reactor at an angle alpha $(\alpha) \geq 5°$ relative to a vertical axis of the reaction zone; or (c) the reactor entry nozzle of the fines return line is coupled to the fluidized bed reactor at an angle beta $(\beta) \geq 5°$ relative to a vertical plane that includes a vertical axis of the fluidized bed reactor and an entry point of the reactor entry nozzle of the fines return line into the fluidized bed reactor; or (d) any combination of conditions (a), (b), and (c) are met.

This summary and the following detailed description provide examples and are explanatory only of the disclosure.

Accordingly, the foregoing summary and the following detailed description should not be considered to be restrictive. Additional features or variations thereof can be provided in addition to those set forth herein, such as for example, various feature combinations and sub-combinations of these described in the detailed description.

BRIEF DESCRIPTION OF THE DRAWINGS

The following figures form a part of the present disclosure and are included to further demonstrate certain aspects of the present disclosure. The disclosure may be better understood by reference to one or more of these figures in combination with the detailed description of the specific embodiments presented herein.

FIG. 2B is a diagram illustrating a partial external view of the gas-phase reactor and the reactor entry nozzle of the fines return line of the solids recovery system of FIG. 2 and showing a more vertical orientation of a fines return line with respect to a reactor versus a horizontal orientation of the reactor entry nozzle.

FIG. 2C is a diagram illustrating a vertical cross sectional view through the reaction zone wall of the fluidized bed reactor in which the vertical reactor axis R and the reactor entry nozzle of the fines return line are in the same plane, and where the location of the wall of the reactor is shown. FIG. 2C shows the orientation of the fines return line being angled by angle α vertically inward relative to a wall of the reactor.

FIG. 3 is a diagram illustrating a partial external view of the gas-phase reactor and the reactor entry nozzle of the fines return line of FIG. 2 in a different configuration, ith the fines return line being angled toward a tangential orientation relative to the curved wall of the reactor.

Figure 1:
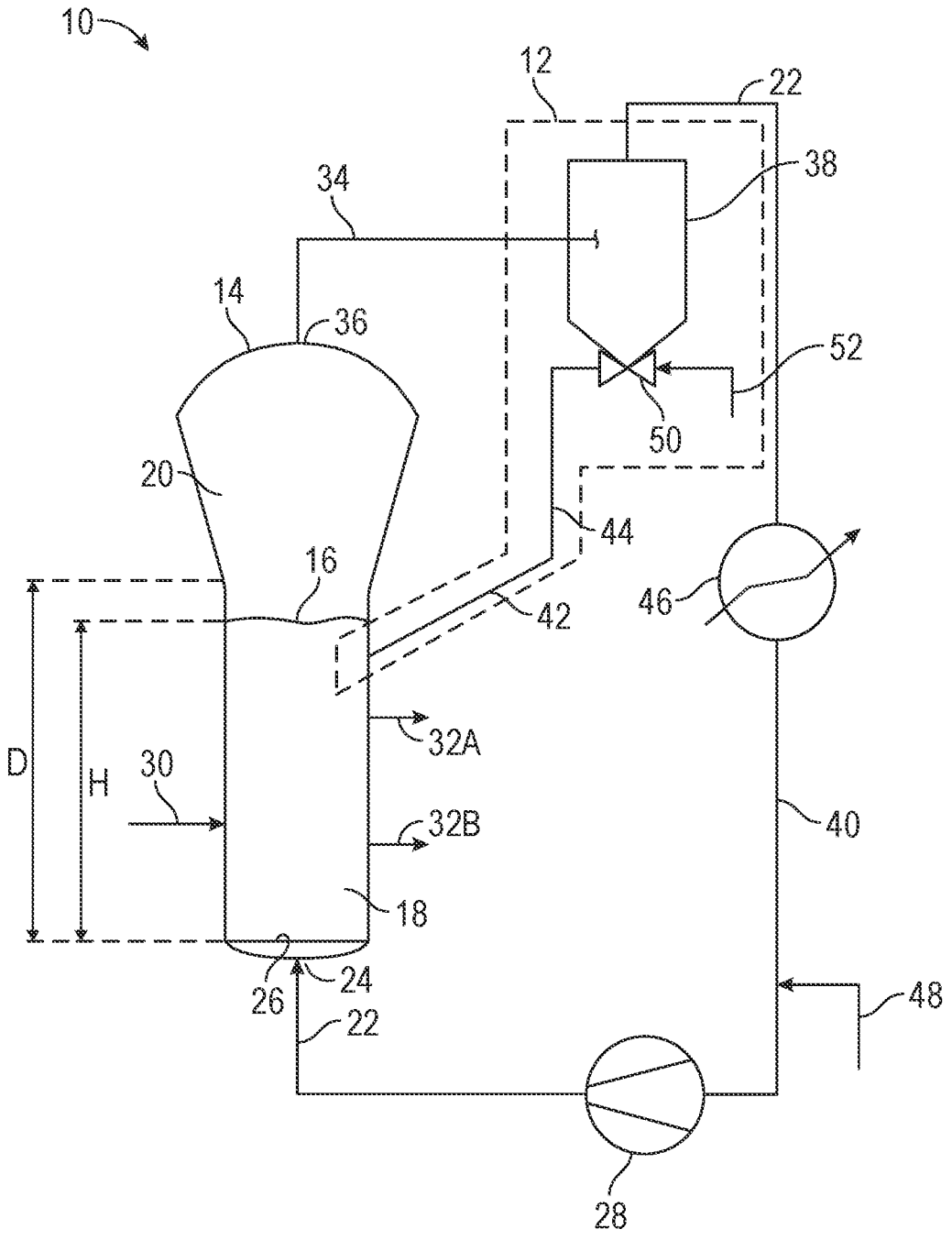
FIG. 1 illustrates an embodiment of a gas-phase polymerization system according to this disclosure.

While the technologies disclosed herein are susceptible to various modifications and alternative forms, only a few specific aspects have been shown by way of example in the drawings and are described in detail below. The figures and detailed descriptions of these specific aspects are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

It is to be understood that the disclosure is not limited in its application to the details of construction and the arrangement of components set forth in the following description or illustrated in the drawings.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

While the systems, compositions, methods and processes are described in terms of "comprising" various components or steps, the systems, compositions, methods and processes may also "consist essentially of" or "consist of" the various components or steps, unless stated otherwise.

The terms "a," "an," and "the" are intended to include plural alternatives, e.g., at least one. The terms "including," "with," and "having," as used herein, are defined as comprising (i.e., open language), unless specified otherwise.

As used herein, the terms "gas-phase polymerization system" and "fluidized bed polymerization system" are used interchangeably and these terms are intended to include both a fluidized bed reactor and a solids recovery system as described herein. As understood by the person skilled in the art, the "fluidized bed reactor" described herein may also termed a gas-phase reactor, gas-phase polymerization reactor, or fluidized bed polymerization reactor.

As used herein, the terms "eductor," "ejector," "eductor pump," "ejector pump," "aspirator" standpipe and similar terms are used interchangeably to refer to devices that use the Venturi effect of a converging nozzle to convert the pressure energy of a motive fluid, in this case a motive gas, to create a low-pressure zone to suction and entrain another fluid. In some embodiments, eductors use a converging (inlet) nozzle and diverging (outlet) diffuser ("converting-diverging nozzle") and the pressure energy of a motive fluid, typically a motive gas, to create a low-pressure zone to suction and entrain another fluid. As used herein, "motive gas" is a gas which is used to entrain polymer fines by imparting suction to the eductor by creating a low-pressure area at the discharge of a nozzle and/or downstream of a constricted area. The reduction in fluid pressure results when a fluid flows through a section of a pipe that first narrows or constricts to a smaller cross section and then enlarges to a larger cross section. The term "converging-diverging nozzle" refers to the portion of the eductor that includes the converging (inlet) nozzle and diverging (outlet) diffuser. Other portions of the eductor relate to how the motive fluid and the other fluid to be entrained enter and/or are mixed in the eductor.

As used herein, the terms "fines," "solid fines," "polymer fines," "solid polymer fines," and the like are used interchangeably herein to refer to solid particles which have an average particle size of less than the median particle size of the solid particles in the relevant gaseous stream within which the particles are entrained. In some embodiments, solid fines can have an aerodynamic diameter of about 100 mesh or less, which is less than 150 μm (microns), such as about 125 μm or less, about 100 μm or less, or about 75 μm or less, or for example, about 2.5 μm (also referred to as $PM_{2.5}$) to about 50 μm, or about 2.5 μm or less. Although the term "polymer" may be associated with the term "fines," the term fines can include any solid particle that can be entrained within the gaseous stream, including catalyst or pre-polymer particles that may be charged to the reactor, growing polymer particles, agglomerated polymer particles, and the flakes or spalling of polymer particles. In some embodiments, the polymer particle size in the process includes a range of different particle sizes in two or more sub-groups. The particles can be from about 75 μm to about 1000 μm, such as about 100 μm to about 900 μm, such as about 200 μm to about 800 μm, such as about 300 μm to about 700 μm, such as about 400 μm to about 600 μm, such as about 500 μm, or any combinations thereof.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about," from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference that Applicant may be unaware of at the time of the filing of the application.

Although any methods and materials similar or equivalent to those described herein can be used in the practice or testing of the disclosure, the typical methods and materials are herein described.

All publications and patents mentioned herein are incorporated herein by reference for the purpose of describing and disclosing, for example, the constructs and methodologies that are described in the publications, which might be used in connection with the present disclosure. The publications discussed throughout the text are provided solely for their disclosure prior to the filing date of the present application. Nothing herein is to be construed as an admission that the inventors are not entitled to antedate such disclosure by virtue of prior disclosure.

In aspects of the present disclosure there is provided a gas-phase polymerization system which includes a fluidized-bed reactor, also termed a gas-phase reactor, and a solids (fines) recover system that returns polymer fines to the fluidized bed reactor. The fluidized bed reactor can include in sequence based on gas flow, a reactor feed inlet, a grid plate, a reaction zone in which the fluidized bed is formed, an expanding section also called a disengagement zone, and a fluidizing gas outlet. The solids (fines) recover system of the gas-phase polymerization system may include a cyclone separator which is in fluid communication with the fluidized gas outlet, and a fines return line. The cyclone separator may be configured to receive fluidizing gas from the fluidizing gas outlet and separate polymer fines from the fluidizing gas. The fines return line may couple the cyclone separator to the fluidized bed reactor and be configured to return separated polymer fines from the cyclone separator to the fluidized bed reactor.

The solids recover system of the gas-phase polymerization system may also include a motive device such as a venturi eductor in fluid communication with and downstream of the cyclone separator, and the fines return line may couple the cyclone separator to the fluidized bed reactor by way of the eductor. By coupling a cyclone separator with a venturi eductors, the polymer fines may be separated and entrained in fluidizing gas that exits the fluidized-bed reactor. Venturi eductors convert the output of a motive gas to create a lower pressure zone that is used to capture polymer particles at the bottom of the cyclone, and transport them back into the reactor. The eductors may be oriented parallel to the longitudinal axis of the reactor or perpendicular to the longitudinal axis of the reactor. One advantage provided by this disclosure when the reactor entry nozzle of the fines return line is positioned and oriented as described herein is that solids recovery systems which do not include a compressor for the motive gas supply of an eductor can return fines to the reaction zone very efficiently.

In an aspect, the fines return line can include what is termed a "reactor entry nozzle", which may also be referred to as an "orientation portion" or "directional portion" of the fines return line, and which terms are used to refer to the portion of the fines return line that is closest to the reaction zone of the fluidized-bed reactor and is or can be oriented, aligned, or angled in a matter that directs the incoming fines and carrier gas for a specific placement within the reaction zone of the fluidized-bed reactor. That is, the orientation, alignment or angling of the fines return line may introduce fines along a predetermined path into the reactor, and in particular, into a fluidized bed in the reactor. The "reactor entry nozzle" of the fines return line may include oriented portions external to the gas-phase reactor and any portion of a fines return line that may extend within the gas-phase reactor above or within the fluidized bed in the reaction zone. One further aspect of the fines return line of this disclosure encompasses a fines return line having an overall shape that reduces, minimizes, or avoids sharp turns or opportunities for fouling, so that flow of the returned fines to the reactor is unencumbered as much as possible.

Accordingly, in an aspect of the disclosure it has been discovered that instead of positioning return lines to reintroduce fines at relatively low positions relatively low positions of the reactor with reference to the fluidized bed, positioning return lines at a relatively greater height of the reactor, for example, at or near a top of a fluidized bed, may increase motive gas flow with limited or no use of a motive gas compressor. For example, the reactor entry nozzle of the fines return line may be coupled to the fluidized bed reactor at a height above the grid plate that is at least 50% of a distance between the grid plate and the bottom of the expanding section. In a further aspect, the fines return line can have a reactor entry nozzle that may be coupled to the fluidized bed reactor at a height above the grid plate that is at least 50% of a distance between the grid plate and the top of the fluidized bed. Positioning the fines return line at such a height may thus reintroduce fines at a relatively greater height, for example, at, adjacent, or above, a top of a fluidized bed in the reactor. In turn, the motive gas flow may increase, promoting the collection of fines. Without being bound by theory, positioning the return lines in such a manner may reduce back pressure on the return line, allowing for higher motive gas flow, and thus increased eductor capacity and efficiency. Such an increase in flow may be thus obtained with reduced reliance on motive gas compressors, such as a solids recovery system that is absent a motive gas compressors. The increased motive gas flow may have further advantages such as increasing eductor capacity and efficiency. Without being bound by theory, a higher motive gas flow may allow collection of a larger fraction of fines than otherwise possible.

In a further aspect, it was discovered that positioning the fines return line too high within the reaction zone may also reduce the effectiveness and efficiency of the fines return. For example, if the fines return location is too high within the reactor, the fines may enter the "cloud" section of the bed and can be carried out of the reactor instead of going back into the fluidized bed. In an aspect, positioning return lines to reintroduce fines from about 3% to about 15% of the bed height below the top of the bed, from about 4% to about 12% of the bed height below the top of the bed, or from about 5% to about 10% of the bed height below the top of the bed work well. For example if the reactor entry nozzle is placed from about 5% to about 10% of the bed height below the top of the bed and the bed height is 60 feet above the grid plate (also termed the distributor grid), then the reactor entry nozzle will be at a height of from about 54 feet to about 57 feet above the grid.

A further aspect of returning polymer fines to the gas-phase reactor is that increased reactor residence time allows the returned fines to grow into larger particles which meet a product size distribution product specification, and these larger particles are less likely to be entrained in fluidizing gas exiting the reactor. It has further been discovered that the angle of entry of the polymer fines return lines into the gas-phase reactor. Firstly, angling return lines down towards the bottom of the reactor to direct fines into the fluidized bed has been found to increase residence time of active polymer fines within the fluidized bed and further promote growth of the fines into sizes that conform to product specification. Specifically, rather than the return line entering the cylindrical reaction zone of the reactor in a radial direction, that is horizontally and coincident with the diameter or a radius of the reactor, the return line is angled downward towards the grid plate, that is, downward relative to the radial direction and relative to a horizontal plane through the reactor. For convenience, this first angle is referred to herein as alpha (α) and is measured as the angle between the reactor entry nozzle of the polymer fines return line and the vertical axis of the reaction zone or a vertical line along the reaction zone wall, where the polymer fines return line enters the reaction zone. Angle values for alpha (α) are greater than 0°, wherein α=0° would describe a reactor entry nozzle of the fines return line lying against the reaction zone wall, and less than 90°, wherein α=900 would describe a reactor entry nozzle of the fines return line oriented horizontally and coincident with a radius of the reactor. In an aspect, the reactor entry nozzle can be angled between 300 and steeper from the reactor wall. For example, when a is greater than 0° but less than or equal to 30°, less than or equal to 25°, less than or equal to 20°, less than or equal to 15°, or less than or equal to 10°, the efficiency of the fines return system and process are high.

Secondly, rather than directing the polymer fines return line within a vertical plane that includes the vertical axis of a cylindrical reactor, by angling the polymer fines return line inwardly toward the interior reaction zone wall and off the vertical plane that includes the vertical axis, it has also been discovered that increased reactor residence times can be achieved to further promote particle growth. In this aspect, the return line may be angled inward toward the reaction zone wall relative to a vertical plane that includes the vertical axis of a cylindrical reactor. This second angle from which the polymer fines angle of entry and the polymer fines return line deviates is referred to herein as beta (β), and is relative to a radial direction and relative to a vertical plane that includes the vertical axis of a cylindrical reactor. In an aspect, the second angle of entry (β) of the polymer fines return line can be tangential or nearly (about) tangential to the interior wall of the reaction zone. By directing the fines return lines at an angle β which can be essentially tangentially to the reaction zone wall, the return lines introduce fines along curved, spiral, helical, or otherwise relatively longer paths, which may increase the residence time.

Examples, aspects, and embodiments of the disclosed system and process are illustrated in the application figures, as follows. Various other aspects of fluidized bed polymerization reactors are illustrated in U.S. Pat. No. 9,334,336, which is incorporated by reference.

Figure 2A:
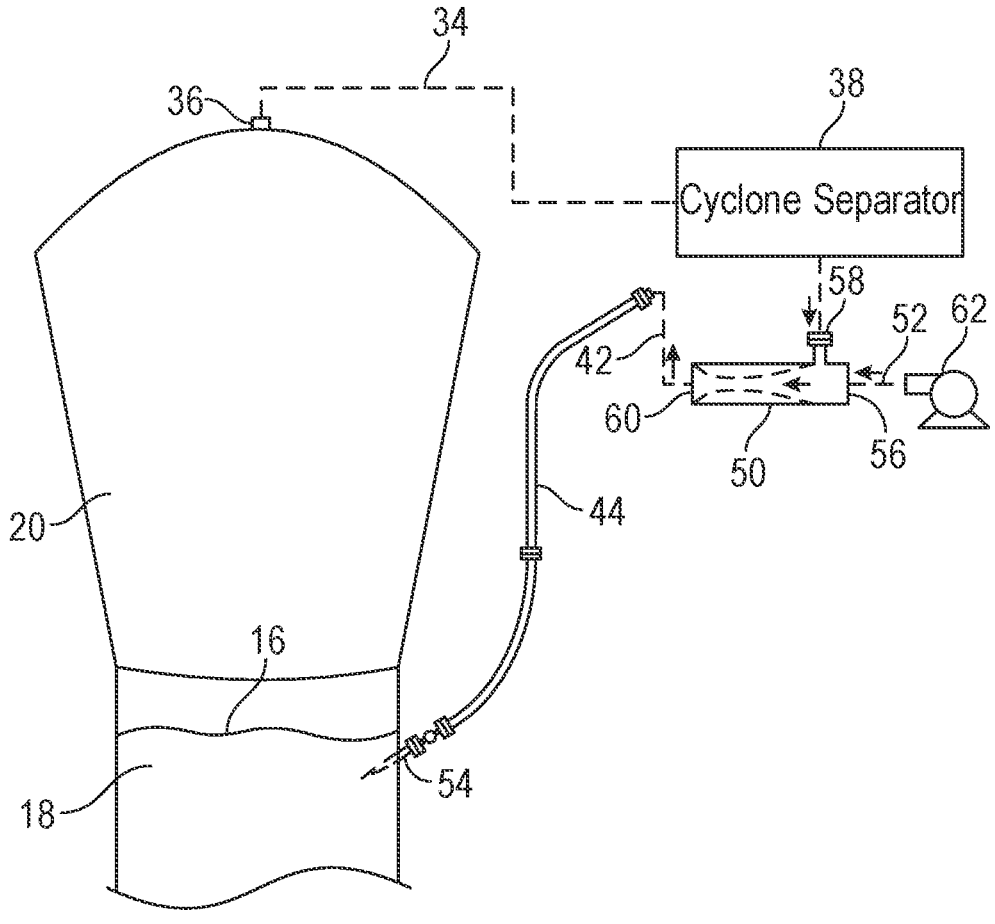
FIG. 2A is a diagram illustrating an embodiment of a solids recovery system for recovering polymer fines from a fluidized bed reactor.

FIG. 1 and FIG. 2A particularly illustrate embodiments of the disclosure related to the position or the height of the fines return lines within the reaction zone of the gas-phase reactor, relative to the height of the fluidized bed of the height above the reactor grid plate, as the fines enter the fluidized bed reactor. FIG. 2B and FIG. 2C particularly illustrate the embodiments of the disclosure in which the reactor entry nozzle of the fines return lines may be angled downward, towards the bottom of the reactor, to direct fines into the fluidized bed in a manner that increases their reactor residence time and improves the polymer particle growth. FIG. 3 particularly illustrates an embodiment in which angling the polymer fines return line inwardly toward a tangential relationship with the curvature of the reaction zone wall and off the vertical plane that includes the vertical axis of the reactor also can increase reactor residence times and promote further residence time and particle growth. In accordance with this disclosure, embodiments of this disclosure can include any one, any two, or all three of these features, namely, the position or height of the fines return lines, the downward angle of the fines return lines, and the inward angle of the fines return lines toward the interior reaction zone wall, as the fines return lines enter the reactor. Each of these features is further described below.

FIG. 1 illustrates an embodiment of a gas-phase polymerization system according to the disclosure in which a polymer fines return line can be deployed, situated, and oriented as described herein. Gas-phase polymerization system 10 includes a solids recovery system 12, also termed a fines recovery system, and further includes a gas-phase reactor 14 configured to operate with a fluidized bed 16 of polyolefin particles, which can grow in size as the polymerization proceeds. The fluidized bed reactor 14 includes a reaction zone 18 in which the fluidized bed 16 is formed and a disengagement zone 20 in which the fluidizing gas can disengage from the solid particles. The disengagement zone 20 also may be referred to as the expanding section of the fluidized bed reactor. The fluidizing gas which includes the olefin(s) to be polymerized enter in the bottom portion of the gas-phase reactor 12 through a fluidizing gas return line 22 which includes at least one reactor feed inlet 24, and the fluidizing gas can enter the reaction zone 18 through a grid plate 26.

Various heights or distances referred to herein may be referenced, for example, to a distance from the grid plate, such as a height measured from the top of the grid plate 26 to the top of the fluidized bed 16 (H) or a percent (%) of that height H, or a distance measured from the top of the grid plate 26 to the top of the reaction zone 18 or bottom of the disengagement zone 20 (D) or a percent (%) of that distance D, and the like. The measurements for height (H) and distance (D) are illustrated in FIG. 1.

In the FIG. 1 embodiment, the fluidizing gas return line 22 can include a fluidizing gas compressor 28 which supplies the fluidizing gas through the reactor feed inlet 24 and into the reactor 14. The fluidizing gas also facilitates heat removal generated in the gas-phase polymerization reactor. The entering fluidizing gas may contain reactants such as olefin monomer and olefin co-monomer, and also may include an inert gas (e.g., nitrogen) and condensable components (e.g., n-pentane). In the FIG. 1 embodiment, a catalyst composition can be added to the reactor through a catalyst composition feed inlet 30, to catalyze the olefin polymerization process. One or more than one catalyst composition feed inlet 30 can be employed, which can be located at various heights along the reaction zone 18. The catalyst composition may include catalysts, co-catalysts, activators, carriers, and the like. In addition to or in lieu of the catalyst addition, a stream of polyolefin particles having residual active catalyst may be added to the reaction zone 18 of the fluidized bed reactor 14 from an upstream polymerization reactor, which can be for example another gas-phase reactor, a loop reactor, a pre-polymerization reactor, and so forth, for further polymerization in the fluidized bed reactor 14.

Polyolefin product particles can be removed from the fluidized bed reactor 14 through one or more product take-offs such as illustrated at 32A and 32B, which are disposed to remove polyolefin from an upper portion (32A) and a lower portion (32B) of the fluidized bed 16, respectively. More or less than two product-takeoffs may be employed.

The fluidizing gas can disengage from the solid polyolefin in the disengagement zone 20, and a discharged mixture 34 of the fluidizing gas and entrained polyolefin solids (fines) exit overhead from the fluidized bed reactor 14 through a fluidizing gas outlet 36. The discharged mixture 34 can enter a solids recovery system 12 which can include a separation device such as a cyclone, separation pot, or other type of separation vessel. The FIG. 1 embodiment illustrates a cyclone separator 38, where the entrained solids can be separated from the discharged mixture 34, and the fluidizing gas 40 can exit overhead from the cyclone separator 38 through the fluidizing gas return line 22. The solid fines are discharged from the bottom of the cyclone 38 and are returned to fluidized bed reactor 14 in a fines return mixture 42 of solids and motive gas through at least one fines return line 44, as discussed below. The fines return mixture 42 may also include any residual fluidizing gas from the cyclone separator 38 that entered the motive device such as a venturi eductor 50 with the solids from the bottom portion of the cyclone separator 38.

The fluidizing gas 40 exiting overhead from the cyclone separator 38 may be routed through a heat exchanger 46 to cool the fluidizing gas and remove at least some of the heat of polymerization, prior to being routed back to the fluidized bed reactor 14. In the FIG. 1 embodiment, a fluidizing gas compressor 28 can be employed to drive the fluidizing gas 40 through the fluidizing gas return line 22 and the reactor feed inlet 24 to reenter the fluidized bed reactor 14. In alternate embodiments, the heat exchanger 46 may be disposed downstream of the compressor 28. One or more makeup streams 48 may be added to the circulating fluidizing gas in the fluidizing gas return line 22 or directly to the fluidized bed reactor 14. Makeup streams 48 may include olefin monomer and olefin comonomer if used to replace the monomer and comonomer consumed in the polymerization process, and makeup streams 48 may also include inert gas and the like.

An exemplary fines recovery system 11 can include a motive device (e.g. an ejector, eductor, injector, jet pump, of the like), such as the venturi eductor 50 illustrated in FIG. 1 and FIG. 2A, and a supply of motive gas 52 (e.g., a slip stream of fluidizing gas or a dedicated gas such as nitrogen). The motive device such as the venturi eductor 50 and motive gas 52 may facilitate the return of the fines in fines return mixture 42 through the fines return line 44 to the fluidized bed reactor 14 from the cyclone separator 38. Therefore, the fines return mixture 42 entering reactor 14 may include, along with solids (fines), the motive gas 52 from the venturi eductor 50 and any residual fluidizing gas from the cyclone separator 38. FIG. 1 illustrates a single fines return line 44, but one or more than one fines return line can be used in embodiments of the fines recovery system 11 for the gas-phase polymerization system.

In some embodiments, polymerization systems can include a motive gas compressor to increase motive gas flow, however other systems may not include a motive gas compressor. Polymerization systems that include a motive gas compressor allow adjusting the pressure of the motive gas to give adequate driving force across the motive device such as an eductor 50. Previously, polymerization systems absent a motive gas compressor were adjusted only by adjusting the supply pressure of the motive gas. One advantage of the system disclosed herein is that by positioning the height of the fines return line as it enters the reaction zone as described, the separation fines recovery system can operate at much greater efficiencies even in the absence of a motive gas compressor.

FIG. 2A illustrates an embodiment detail of a solids recovery system 12 for recovering polymer fines from a fluidized bed reactor 14, which is illustrated more generally in FIG. 1, and a portion of the fluidized bed reactor 14 is also shown in FIG. 2A. The solids recovery system 12 is seen to include a cyclone separator 38 fluidically coupled to reactor 14 through a fines return line 44, which includes a venturi eductor 50. Again, while FIG. 2A illustrates only a single fines return line 44, one or more than one fines return lines can be used in embodiments of the fines recovery system 11.

FIG. 2A also illustrates the fluidizing gas outlet 36 of the fluidized bed reactor 14 which is in fluid communication with the cyclone separator 38, and through which discharged mixture 34 is removed from the disengagement zone 20 of reactor 14. The cyclone separator 38 is configured to receive the discharged mixture 34, which can include polymer fines entrained in the fluidizing gas and which may be separated from the fluidizing gas 40 by circulation in the cyclone separator 38. A tangential entry of fluidizing gas into the cyclone separator creates a rotational flow pattern, which results in centrifugal forces driving the polymer fines toward the wall of the cyclone separator 38. The gas initially travels downward along a wall of the cyclone, then reverses direction and travels upward through a central region of the cyclone separator 38. Thus, fluidizing gas 40 from which fines have been removed or reduced exits a top of the cyclone separator 38. In contrast with the fluidizing gas, the polymeric fines do not change direction in the cyclone and exit through the bottom of the cyclone separator 38, ultimately separating at least a portion or fraction of fines from the fluidizing gas entering the cyclone. The fluidizing gas 40 then may be returned to the fluidized bed reactor 14 by the fluidizing gas return line 48, and the fines may be returned to the reactor 14 by the fines return line 44 at a different location in the reactor to promote growth in particle size. Increasing the particle polymer size and thus, reducing fines ultimately leaving the reactor, may reduce fouling of heat exchangers, compressors, valves, and other components that may be employed in the fluidizing gas return line. This is because the fines that are carried out of the reactor are very active, and the fines will adhere to the process piping and equipment such as heat exchangers. These adhered particles will continue to grow, resulting in the fouling of downstream equipment and loop piping. When fouling become severe, it becomes necessary for the operational unit to perform a unit outage to clean the equipment. Thus, systems according to the present disclosure may allow increasing fluidization velocity without increasing the rate of reactor gas loop fouling.

Referring to FIG. 1 and FIG. 2A, the fines return line 44 couples the cyclone separator 38 to the fluidized bed reactor 14 and is configured to return separated polymer fines from the cyclone separator to the reactor. In an aspect, the fines return lines comprise a smooth bore piping with no ledges to prevent polymer fouling in this line, and the line can have no sharp bends. The fines return line 44 has a reactor entry nozzle 54 that may be coupled to the fluidized bed reactor 14 at various heights above the grid plate 26. In an aspect, various heights or distances referred to herein may be referenced, for example, to a certain height above or distance from the top of the grid plate 26. For example, in one aspect, a distance may be measured from the top of grid plate 26 to bottom of the disengagement zone 20 (D), and a location within the reactor may be reported as a percent (%) of that Distance D. In another aspect, for example, a height may be measured from the top of grid plate 26 to the top of the fluidized bed 16 (H), and a location within the reactor may be reported as a percent (%) of that Height H. For clarity, the top of the fluidized bed is the vertical location at the top of the polymer cloud of the fluidized bed where the bubbles are bursting and where there is a time-averaged location that is static. The measurements for height (H) and distance (D) are illustrated in FIG. 1.

In an aspect, the fines return line 44 includes a reactor entry nozzle 54 that may be coupled to the fluidized bed reactor 14 at a location above the grid plate 26 that is at least 50% of a distance D between the top of the grid plate 26 and a bottom of the disengagement zone 20. For the purposes of this measurement, the bottom of the disengagement zone 20 is also the top of the reaction zone 18, as illustrated in FIG. 1. The height of the reactor entry nozzle 54 above the grid plate 26 may be at least 50% of the distance D, at least 55% of the distance D, or at least 60% of the distance D, or at least 65% of the distance D, or at least 70% of the distance D, or at least 75% of the distance D, or at least 80% of the distance D, or at least 85% of the distance D, or at least 90% of the distance D. In some embodiments, the height of the reactor entry nozzle 54 may be lower, for example, being between 0 and 50% of the distance D. For example, the height of the reactor entry nozzle 54 may be at least 5% of the distance D, or at least 10% of the distance D, or at least 15% of the distance D, or at least 20% of the distance D, or at least 25% of the distance D, or at least 30% of the distance D, or at least 35% of the distance D, or at least 40% of the distance D, or at least 45% of the distance D.

The height of the reactor entry nozzle 54 above the grid plate 26 may be less than or equal to 95% of the distance D, or less than or equal to 90% of the distance D, or less than or equal to 85% of the distance D, or less than or equal to 80% of the distance D, or less than or equal to 75% of the distance D, or less than or equal to 70% of the distance D, or less than or equal to 65% of the distance D, or less than or equal to 60% of the distance D. The height of the reactor entry nozzle 54 above the grid plate 26 may be 5% of the distance D, or 15% of the distance D, or 20% of the distance D, or 25% of the distance D, or 30% of the distance D, or 35% of the distance D, or 40% of the distance D, or 45% of the distance D, or 50% of the distance D, or 55% of the distance D, or 60% of the distance D, or 65% of the distance D, or 70% of the distance D, or 75% of the distance D, or 80% of the distance D, or 85% of the distance D, or 90% of the distance D, or 95% of the distance D.

In embodiments, the reactor entry nozzle 54 may be located less than or equal to 50 feet from the bottom of the disengagement zone 20, or less than or equal to 40 feet from the bottom of the disengagement zone 20, or less than or equal to 30 feet from the bottom of the disengagement zone 20, or less than or equal to 20 feet from the bottom of the disengagement zone 20, or less than or equal to 10 feet from the bottom of the disengagement zone 20.

According to a further aspect, the reactor entry nozzle 54 of the fines return line 44 that may be coupled to the fluidized bed reactor 14 at a height above the grid plate 26 that is at least 50% of a height (H) of the fluidized bed, that is, from the top of the grid plate 26 to the top of the fluidized bed 16 in the reaction zone 18 of the gas-phase reactor, as illustrated in FIG. 1. The height of the reactor entry nozzle 54 above the grid plate 26 may be at least 50% of the height H, or at least 55% of the height H, or at least 60% of the height H, or at least 65% of the height H, or at least 70% of the height H, or at least 75% of the height H, or at least 80% of the height H, or at least 85% of the height H, or at least 90% of the height H. In some embodiments, the height of the reactor entry nozzle 54 may be lower, for example, being between 0 and 50% of the height H. For example, the height of the reactor entry nozzle 54 may be at least 5% of the height H, or at least 10% of the height H, or at least 15% of the height H, or at least 20% of the height H, or at least 25% of the height H, or at least 30% of the height H, or at least 35% of the height H, or at least 40% of the height H, or at least 45% of the height H.

The height of the reactor entry nozzle 54 above the grid plate may be less than or equal to 95% of the height H, or less than or equal to 90% of the height H, or less than or equal to 85% of the height H, or less than or equal to 80% of the height H, or less than or equal to 75% of the height H, or less than or equal to 70% of the height H, or less than or equal to 65% of the height H, or less than or equal to 60% of the height H. The height of the reactor entry nozzle 54 above the grid plate may be 5% of the height H, or 15% of the height H, or 20% of the height H, or 25% of the height H, or 30% of the height H, or 35% of the height H, or 40% of the height H, or 45% of the height H, or 50% of the height H, or 55% of the height H, or 60% of the height H, or 65% of the height H, or 70% of the height H, or 75% of the height H, or 80% of the height H, or 85% of the height H, or 90% of the height H, or 95% of the height H.

The fines return line 44 may include one or more sections of pipe, and the one or more sections of pipe may be straight or curved or a combination thereof. The fines return line 44 may further include one or more valves, for example, a ball valve. It is advantageous if the fines return line has an overall shape and curvature that avoids sharp turns to reduce or minimize opportunities for fouling, so that flow of the returned fines to the reactor is unencumbered as much as possible.

As illustrated in FIG. 1 and FIG. 2A, the fines return line 44 may include a motive device such as a venturi eductor 50 coupled between the cyclone separator 38 and the fluidized bed reactor 14. The venturi eductor 50 may include a motive gas inlet 56, a suction inlet 58 coupled to the cyclone separator 38, and an eductor discharge outlet 60 coupled to the fluidized bed reactor 14. The venturi eductor 50 may be configured to provide a pressure lower than that in the cyclone separator 38, which draws fines from the cyclone separator. The solids recovery system 12 may further include a motive gas supply 62 coupled to the motive gas inlet 56. The motive gas supply 62 may include a fan, a blower, a compressor, or any suitable motive gas supply. The lower pressure may be induced by flow of the motive gas through the venturi eductor 50. The flow of motive gas generates a relative vacuum by a venturi effect, which can be used to entrain polymer fines separated from fluidizing gas in the cyclone separator, and direct, reintroduce, or reinject the fines into the fluidized bed reactor via the reactor entry nozzle 54 of the fines return line 44.

While the venturi eductor 50 may be horizontal as shown in FIG. 2A, in other embodiments, the venturi eductor 50 may be angled or vertical. In one aspect, the venturi eductor can be oriented in a vertical orientation, which helps minimize or prevent low flow areas or areas where the fines flow must change direction. The smoother flow path for the fines helps reduce eductor fouling. In an aspect, for example, the venturi eductor 24 may be angled at least 5°, or at least 10°, or at least 15°, or at least 20°, or at least 25°, or at least 30°, or at least 35°, or at least 40°, or at least 45°, or at least 50°, or at least 55°, or at least 60°, or at least 65°, or at least 70°, or at least 75°, or at least 80°, or at least 85°, relative to a horizontal direction perpendicular to a gravitational direction. The venturi eductor may be angled or less than or equal to 90°, or less than or equal to 85°, or less than or equal to 80°, or less than or equal to 75°, less than or equal to 70°, or less than or equal to 65°, less than or equal to 60°, or less than or equal to 55°, less than or equal to 50°, or less than or equal to 45°, or less than or equal to 40°, or less than or equal to 35°, or less than or equal to 30°, or less than or equal to 25°, or less than or equal to 20°, or less than or equal to 15°, relative to the horizontal direction perpendicular to a gravitational direction.

While a single fines return line 44 and venturi eductor 50 are shown in FIG. 2A, the solids recovery system 12 may include one or more than one fines return line and/or venturi eductor. In an aspect, multiple cyclone, eductor, and return line combinations can be employed in the solids recovery system 12 of the gas-phase reactor. One advantage of multiple cyclone, eductor, and return line combinations is eliminating the need to install a single, very large and difficult to install cyclone with its eductor and return line.

A circulation pattern of particles in the fluidized bed can be such that polymer particles may be carried upward in the middle of the bed, and downward on the outside of the bed. Reintroducing fines such that they enter in the downward stream or circulation zone may increase residence times. The increased residence time allows fines to grow into larger particles that are no longer entrained in fluidizing gas exiting the reactor, which in turn allows the polymer product to meet product size distribution specifications.

Accordingly, angling return lines down to direct fines into the bed may increase residence time of active polymer fines in the fluidized bed, which promotes growth of the fines into sizes that conform to product specification, instead of contributed to lost yield. The return line may be angled inward from a reactor wall relative to a vertical axis of the reactor and/or angled tangentially relative to the reactor wall. Thus, instead of directing fines in a straight or short path, which may reduce residence time, the return lines may be oriented to introduce fines along curved, spiral, helical, or otherwise relatively longer paths, which may increase the residence time and particle size. For example, the fines may be directed along the reactor wall.

FIG. 2B and FIG. 2C are diagrams illustrating two different partial views of the solids recovery system of FIG. 2A, which highlight the more vertical orientation of the reactor entry nozzle 54 of the fines return line with respect to the reactor, which departs from the horizontal plane that includes the entry of the reactor entry nozzle 54 into the reaction zone 18. The view of FIG. 2B is oriented 90° from the view of FIG. 2C, within the same horizontal plane near the reactor entry nozzle 54 of the fines return line 44 as it is in fluid communication with the reaction zone 18 of the gas-phase reactor. FIG. 2B illustrates a partial front view of the reactor entry nozzle 54 of the fines return line 44 from a viewer's perspective outside the gas-phase reactor, in which a portion of the outside wall of the reactor is illustrated, and the underside of the reactor entry nozzle 54 can be seen. In this orientation illustrated in FIG. 2B and FIG. 2C, the reactor vertical axis R and the reactor entry nozzle 54 can be seen to be within the same vertical plane.

The view in FIG. 2C is a vertical cross sectional view through the reaction zone wall 64 which encompasses a cross-section of the reactor entry nozzle 54 of the fines return line 44 in fluid communication with the reaction zone. In this FIG. 2C view, the orientation of the reactor entry nozzle 54 of the fines return line 44 is within the same plane as the reactor vertical axis R as plainly seen, and the departure from horizontal of the reactor entry nozzle 54 is also plainly seen. The downward angle of the return line can be measured relative to the reaction zone wall 64 where the polymer fines return line enters the reaction zone 18 so that angle values are greater than 0° (a vertical orientation) and less than 90° (a horizontal orientation). This first angle from the reactor wall at which the polymer fines return line deviates is referred to herein as alpha (α), as illustrated in FIG. 2C.

With reference to FIG. 2C, the reactor entry nozzle 54 may be angled such that $\alpha \geq 5°$, or $\alpha \geq 10°$, or $\alpha \geq 15°$, or $\alpha \geq 25°$, or $\alpha \geq 30°$, or $\alpha \geq 350$, or $\alpha \geq 40°$, or $\alpha \geq 45°$, or $\alpha \geq 50°$, or $\alpha \geq 55°$, or $\alpha \geq 60°$. The reactor entry nozzle 54 may be angled such that $\alpha \leq 60°$, or $\alpha \leq 50°$, or $\alpha \leq 45°$, or $\alpha \leq 40°$, or $\alpha \leq 35°$, or $\alpha \leq 30°$, or $\alpha \leq 25°$, or $\alpha \leq 20°$. Also disclosed are any ranges between any of these lower limit angles and these upper limit angles. The designation ">=" is used to mean greater than or equal to, which may also be designating using "≥", and the designation <= is used to mean less than or equal to, which may also be designating using "≤". In an aspect, the angle α may be in a range of from 5° to 50°, or from 10° to 40°, or from 15° to 30°, or from 10° to 30°. In embodiments, the angle α may be in a range of from 5° to 60°, or from 10° to 60°, or from 20° to 60°, or from 30° to 60°, or from 40° to 60°, or from 5° to 50°, or from 10° to 50°, or from 20° to 50°, or from 30° to 50°, or from 40° to 50°, or from 5° to 40°, or from 10° to 40°, or from 20° to 40°, or from 30° to 40°, or from 50° to 60°. Instead of relative to the reaction zone wall 64, the angle may be defined relative to the vertical axis R. If the reaction zone wall 64 is parallel to the axis R, these angles are the same, however defined. Thus, the reactor entry nozzle 54 may be angled 15 degrees or more relative to the vertical axis R along the reactor. In embodiments, the reactor entry nozzle 54 may be angled 25 degrees or more relative to the vertical axis R. In embodiments, the reactor entry nozzle 54 may be angled 30 degrees or more relative to the vertical axis R. In embodiments, the reactor entry nozzle 54 may be angled 40 degrees or more relative to the vertical axis R.

FIG. 3 is a diagram illustrating a partial external view of the gas-phase reactor and the reactor entry nozzle 54 of the fines return line 44 of FIG. 2 in a different configuration, with the fines return line being angled toward a tangential orientation relative to the curved reaction zone wall 64. The viewer's perspective in FIG. 3 is the same as the viewer's perspective in FIG. 2B, in which the viewer's perspective is outside the gas-phase reactor and a portion of the outside wall of the reactor is illustrated. In this FIG. 3 orientation, the reactor vertical axis R is also illustrated, and the reactor entry nozzle 54 can be seen to be angled with respect to the reactor vertical axis R, and therefore not in the same vertical plane as reactor vertical axis R. In FIG. 3, the reactor entry nozzle 54 of the fines return line 44 is both angled vertically inward relative to the reaction zone wall 64 by angle α, and angled tangentially relative to the curved reaction zone wall 64. The degree or extent of the entry angle in the tangential direction can be measured relative to the vertical plane that contains the reactor axis R and the entry point of the reactor entry nozzle 54 into the gas-phase reactor by angle β. By angling the reactor entry nozzle 54 by angle β as illustrated in FIG. 3, the reactor entry nozzle is being angled in a "tangential direction", wherein the tangential direction would have a theoretical angle β that is 90° measured relative to the vertical plane that contains the reactor axis R and the entry point of the reactor entry nozzle 54. Therefore, while the embodiment shown in FIG. 2B and FIG. 2C has a non-zero angle α, the reactor entry nozzle in these figures has an angle β that is 0° relative to the vertical plane that contains the reactor axis R and the entry point of the reactor entry nozzle, whereas the FIG. 3 embodiment has a non-zero angle β relative to that same vertical plane.

With reference to FIG. 3, the reactor entry nozzle 54 of the fines return line 44 of FIG. 2 is illustrated with the reactor entry nozzle 54 being angled tangentially relative to the curvature of the reaction zone wall 64 of the fluidized bed reactor, defining an angle β tangentially with respect to the vertical plane that contains the reactor axis R and the entry point of the reactor entry nozzle 54 into the gas-phase reactor. Thus, angle β may be varied independently of angle α, and either of these angles may be zero or more than zero. Further, the angles α and β may be the same or different, or within similar ranges, or within different ranges. The reactor entry nozzle 54 may be angled such that β>=5°, or β>=10°, or β>=15°, or β>=25°, or β>=30°, or β>=35°, or β>=40°, or β>=45°, or β>=50°, or β>=55°, or β>=60°, or β>=65°, or β>=70°, or β>=75°, or β>=80°, or β>=85°, or β=90°. The reactor entry nozzle 54 may be angled such that β<90°, β<=85°, β<=80°, β<=75°, β<=70°, β<=65°, β<=60°, or β<=50°, or β<=45°, or β<=40°, or β<=35°, or β<=30°, or β<=25°, or β>=20°. Also disclosed are any ranges between any of these lower limit angles and these upper limit angles. In an aspect, the angle β may be in a range of from 30° to 90°, or from 40° to 85°, or from 45° to 80°, or from 50° to 75°. In other aspects, the angle β may be in a range of from 50° to 85°, or from 60° to 80°, of from 60° to 85°, or from 50° to 80°. In other aspects and embodiments, the angle β may be in a range of from 5° to 60°, or from 10° to 60°, or from 20° to 60°, or from 30° to 60°, or from 40° to 60°, or from 5° to 50°, or from 10° to 50°, or from 20° to 50°, or from 30° to 50°, or from 40° to 50°, or from 5° to 40°, or from 10° to 40°, or from 20° to 40°, or from 30° to 40°, or from 50° to 60°.

By angling the reactor entry nozzle 54 tangentially by angle β with respect to the curvature of the reaction zone wall 64 as described, the incoming fines can be provided with a more circumferential flow, a spiral flow, or some curved path to the fines stream. Such a path can increase the residence time, promoting the desired particle size growth of the fines.

Regardless of the orientation defined by the angles, the reactor entry nozzle 54 may be located at a suitable distance relative to a bottom of the fluidized bed 16, from the top of the grid plate 26, a top of the reaction zone 18 where the disengagement zone 20 begins, or an expected height of a top, a center, or a bottom of the fluidized bed 16 formed within the fluidized bed reactor 14. The expected location of the center, the top, or the bottom of the fluidized bed 16 may be determined based on operational parameters and size of the fluidized bed reactor 14 as understood by the person of ordinary skill in the art.

In embodiments, a center of the fluidized bed 16 may be located at a height from the top of the grid plate 26 that is at least 50% of the height of the reaction zone 18, or at least 60% of the reaction zone height, or at least 70% of the reaction zone height, or at least 80% of the reaction zone height. In embodiments, the center of the fluidized bed 16 may be located at a height from top of the grid plate 26 that is less than or equal to 90% of the height of the reaction zone 18, or less than or equal to 80% of the reaction zone height, or less than or equal to 70% of the reaction zone height, or less than or equal to 60% of the reaction zone height. In embodiments, the center of the fluidized bed 16 may be located at a height from the top of the grid plate 26 that is in a range from 50% to 90% of the height of the reaction zone 18, or from 60% to 90% of the reaction zone height, or from 70% to 90% of the reaction zone height, or from 50% to 80% of the reaction zone height, or from 50% to 70% of the reaction zone height, or from 50% to 60% of the reaction zone height.

In embodiments, the fluidized bed 16 may have a bed thickness in a vertical direction along the reactor axis R that is at least 5% of the height of the reaction zone 18, or at least 10% of the reaction zone height, or at least 15% of the reaction zone height, or at least 20% of the reaction zone height. In embodiments, the bed thickness may be less than or equal to 30% of the reaction zone height, or less than or equal to 25% of the reaction zone height, or less than or equal to 20% of the reaction zone height, or less than or equal to 15% of the reaction zone height, or less than or equal to 10% of the reaction zone height, or less than or equal to 5% of the reaction zone height. In embodiments, the bed thickness may be in a range from 1% to 30% of the reaction zone height, or from 5% to 30% of the reaction zone height, or from 10% to 30% of the reaction zone height, or from 20% to 80% of the reaction zone height, or from 1% to 20% of the reaction zone height, or from 5% to 20% of the reaction zone height, or from 10% to 20% of the reaction zone height, or from 1% to 10% of the reaction zone height, or from 1% to 5% of the reaction zone height.

In embodiments, the reactor entry nozzle 54 of the fines return line 44 may be located at a distance from the top of the grid plate 26 that is at least 60% of a bed height of the fluidized bed 16, that is, at least 60% of the distance from the top of the grid plate 26 to the top of the fluidized bed 16. The distance may be at least 70% of the height of the fluidized bed, or at least 80% of the fluidized bed height. The distance may be 90% or less of the fluidized bed height, or 80% or less of the fluidized bed height, or 70% or less of the fluidized bed height. The distance may be in a range of from 60% to 90% of the fluidized bed height, or from 60% to 80% of the fluidized bed height, or from 70% to 90% of the fluidized bed height.

In another aspect, the reactor entry nozzle 54 of the fines return line 44 may be located at a distance from a top of the fluidized bed 16 that is less than or equal to twice a reaction zone 18 diameter of the fluidized bed reactor 14. The reaction zone diameter 18 may be an average reaction zone diameter or a maximum reaction zone diameter of this diameter varies, or simply the diameter across the fluidized bed if this diameter does not vary. The reactor entry nozzle 54 may be located at a distance from a top of the fluidized bed 16 that is less than or equal to the reaction zone diameter. The reactor entry nozzle 54 may be located at a distance from a top of the fluidized bed 16 that is less than or equal to half the reaction zone diameter.

According to a further aspect, the reactor entry nozzle 54 may be located at a distance from a top of the fluidized bed 16 of the fluidized bed reactor 14 that is greater than or equal to one tenth ($\frac{1}{10}$) of the reaction zone diameter. The distance may be greater than or equal to one fifth ($\frac{1}{5}$) of the reaction zone diameter. The distance may be in a range of from one tenth of the reaction zone diameter to one third ($\frac{1}{3}$) of the reaction zone diameter, or from one fifth of the reaction zone diameter to one fourth ($\frac{1}{4}$) of the reaction zone diameter, or from one tenth of the reaction zone diameter to one fourth of the reaction zone diameter.

It has been discovered that the positioning and angling of the reactor entry nozzle of the return line described herein enables the use of increasing eductor size, reduces or eliminates the use of motive gas compressors, and enhances production rates while limiting fouling. Particularly during production of polymers having higher melt index and known to generate a high concentration of fines.

The disclosure is described above with reference to numerous aspects and embodiments, and specific examples. Many variations will suggest themselves to those skilled in the art in light of the above detailed description. All such obvious variations are within the full intended scope of the appended claims. Other aspects of the disclosure can include, but are not limited to, the following aspects.

Statements of the Disclosure

Statement 1. A gas-phase polymerization system comprising:
a fluidized bed reactor comprising a reactor feed inlet and a fluidizing gas outlet;
a cyclone separator coupled to (and in fluid communication with) the fluidizing gas outlet and configured to receive a fluidizing gas comprising polymer fines and separate the polymer fines from the fluidizing gas;
a venturi eductor coupled between the cyclone separator and the fluidized bed reactor and configured to receive the separated polymer fines from the cyclone separator; and
a fines return line coupling the venturi eductor to the fluidized bed reactor and configured to return the separated polymer fines from the venturi eductor to the fluidized bed reactor;
wherein the fluidized bed reactor further comprises a grid plate above the reactor feed inlet, a reaction zone above the grid plate, and a disengagement zone above the reaction zone and having a larger diameter than the reaction zone, and
wherein the fines return line has a reactor entry nozzle coupled to the fluidized bed reactor at a height above a top of the grid plate that is at least 50% of a height (H) of the fluidized bed measured from the top of the grid plate and a top of a fluidized bed.

Statement 2. A gas-phase polymerization system comprising:
a fluidized bed reactor comprising a reactor feed inlet and a fluidizing gas outlet;
a cyclone separator coupled to (and in fluid communication with) the fluidizing gas outlet and configured to receive a fluidizing gas comprising polymer fines and separate the polymer fines from the fluidizing gas;
a venturi eductor coupled between the cyclone separator and the fluidized bed reactor and configured to receive the separated polymer fines from the cyclone separator; and
a fines return line coupling the venturi eductor to the fluidized bed reactor and configured to return the separated polymer fines from the venturi eductor to the fluidized bed reactor;
wherein the fluidized bed reactor further comprises a grid plate above the reactor feed inlet, a reaction zone above the grid plate, and a disengagement zone above the reaction zone and having a larger diameter than the reaction zone, and
wherein the fines return line has a reactor entry nozzle coupled to the fluidized bed reactor at an angle alpha ($\alpha$)$\leq$5° relative to a vertical axis of the reaction zone.

Statement 3. A gas-phase polymerization system comprising:
a fluidized bed reactor comprising a reactor feed inlet and a fluidizing gas outlet;
a cyclone separator coupled to (and in fluid communication with) the fluidizing gas outlet and configured to receive a fluidizing gas comprising polymer fines and separate the polymer fines from the fluidizing gas;
a venturi eductor coupled between the cyclone separator and the fluidized bed reactor and configured to receive the separated polymer fines from the cyclone separator; and
a fines return line coupling the venturi eductor to the fluidized bed reactor and configured to return the separated polymer fines from the venturi eductor to the fluidized bed reactor;
wherein the fluidized bed reactor further comprises a grid plate above the reactor feed inlet, a reaction zone above the grid plate, and a disengagement zone above the reaction zone and having a larger diameter than the reaction zone, and
wherein the fines return line has a reactor entry nozzle coupled to the fluidized bed reactor at an angle beta ($\beta$)$\geq$5° relative to a vertical plane that includes a vertical axis of the fluidized bed reactor and an entry point of the reactor entry nozzle of the fines return line into the fluidized bed reactor.

Statement 4. A process for returning polymer fines to a gas-phase polymerization reactor, the process comprising:
polymerizing at least one olefin in a fluidizing gas in a reaction zone of a fluidized bed reactor;
providing the fluidizing gas comprising polymer fines from the fluidized bed reactor to a cyclone separator;

separating the polymer fines from the fluidizing gas in the cyclone separator;

drawing the polymer fines from the cyclone separator to a venturi eductor by supplying a motive gas to the venturi eductor and discharging the polymer fines with a motive gas; and supplying the polymer fines in a fines return mixture through a fines return line to the fluidized bed reactor;

wherein the fluidized bed reactor includes a reactor feed inlet, a grid plate above the reactor feed inlet, a reaction zone above the grid plate, and a disengagement zone above the reaction zone and having a larger diameter than the reaction zone, and wherein the fines return line has a reactor entry nozzle coupled to the fluidized bed reactor at a height above a top of the grid plate that is at least 50% of a height (H) of the fluidized bed measured from the top of the grid plate and a top of a fluidized bed.

Statement 5. A process for returning polymer fines to a gas-phase polymerization reactor, the process comprising:

polymerizing at least one olefin in a fluidizing gas in a reaction zone of a fluidized bed reactor;

providing the fluidizing gas comprising polymer fines from the fluidized bed reactor to a cyclone separator;

separating the polymer fines from the fluidizing gas in the cyclone separator;

drawing the polymer fines from the cyclone separator to a venturi eductor by supplying a motive gas to the venturi eductor and discharging the polymer fines with a motive gas; and supplying the polymer fines in a fines return mixture through a fines return line to the fluidized bed reactor;

wherein the fluidized bed reactor includes a reactor feed inlet, a grid plate above the reactor feed inlet, a reaction zone above the grid plate, and a disengagement zone above the reaction zone and having a larger diameter than the reaction zone, and wherein the fines return line has a reactor entry nozzle coupled to the fluidized bed reactor at an angle alpha $(\alpha) \leq 5°$ relative to a vertical axis of the reaction zone.

Statement 6. A process for returning polymer fines to a gas-phase polymerization reactor, the process comprising:

polymerizing at least one olefin in a fluidizing gas in a reaction zone of a fluidized bed reactor;

providing the fluidizing gas comprising polymer fines from the fluidized bed reactor to a cyclone separator;

separating the polymer fines from the fluidizing gas in the cyclone separator;

drawing the polymer fines from the cyclone separator to a venturi eductor by supplying a motive gas to the venturi eductor and discharging the polymer fines with a motive gas; and supplying the polymer fines in a fines return mixture through a fines return line to the fluidized bed reactor;

wherein the fluidized bed reactor includes a reactor feed inlet, a grid plate above the reactor feed inlet, a reaction zone above the grid plate, and a disengagement zone above the reaction zone and having a larger diameter than the reaction zone, and wherein the fines return line has a reactor entry nozzle coupled to the fluidized bed reactor at an angle beta $(\beta) \geq 5°$ relative to a vertical plane that includes a vertical axis of the fluidized bed reactor and an entry point of the reactor entry nozzle of the fines return line into the fluidized bed reactor.

Statement 7. The gas-phase polymerization system or the process for returning polymer fines to a gas-phase polymerization reactor according to any of statements 1 and 4, wherein the following conditions are met:

(a) the fines return line has a reactor entry nozzle coupled to the fluidized bed reactor at an angle alpha $(\alpha) \leq 5°$ relative to a vertical axis of the reaction zone; or (b) the fines return line has a reactor entry nozzle coupled to the fluidized bed reactor at an angle beta $(\beta) \geq 5°$ relative to a vertical plane that includes a vertical axis of the fluidized bed reactor and an entry point of the reactor entry nozzle of the fines return line into the fluidized bed reactor; or (c) both conditions (a) and (b) are met.

Statement 8. The gas-phase polymerization system or the process for returning polymer fines to a gas-phase polymerization reactor according to any of statements 2 and 5, wherein:

the fines return line has a reactor entry nozzle coupled to the fluidized bed reactor at an angle beta $(\beta) \geq 5°$ relative to a vertical plane that includes a vertical axis of the fluidized bed reactor and an entry point of the reactor entry nozzle of the fines return line into the fluidized bed reactor; or Statement 9. The gas-phase polymerization system or the process for returning polymer fines to a gas-phase polymerization reactor according to any preceding statement, wherein the reactor entry nozzle of the fines return line is coupled to the fluidized bed reactor at a distance above a top of the grid plate that is at least 50% of the distance (D) between the top of the grid plate and a top of the reaction zone.

Statement 10. The gas-phase polymerization system or the process for returning polymer fines to a gas-phase polymerization reactor according to any preceding statement, wherein the reactor entry nozzle of the fines return line is coupled to the fluidized bed reactor at a height above a top of the grid plate that is less than or equal to 95% of the height (H) of the fluidized bed measured from the top of the grid plate and a top of a fluidized bed.

Statement 11. The gas-phase polymerization system or the process for returning polymer fines to a gas-phase polymerization reactor according to any preceding statement, wherein the reactor entry nozzle of the fines return line is coupled to the fluidized bed reactor at a distance above a top of the grid plate that is less than or equal to 95% of the distance (D) between the top of the grid plate and a top of the reaction zone.

Statement 12. The gas-phase polymerization system or the process for returning polymer fines to a gas-phase polymerization reactor according to any preceding statement, wherein the venturi eductor includes a motive gas inlet, a suction inlet coupled to the cyclone separator, and an eductor discharge outlet coupled to the fluidized bed reactor.

Statement 13. The gas-phase polymerization system according to any preceding statement, further comprising a motive gas supply coupled to the motive gas inlet.

Statement 14. The gas-phase polymerization system or the process for returning polymer fines to a gas-phase polymerization reactor according to any preceding statement, wherein the reactor entry nozzle of the fines return line is coupled to the fluidized bed reactor at a height above a top of the grid plate that is at least 55%, at least 60%, at least 65%, at least 70%, at least 75%, at least 80%, at least 85%, or at least 90% of the height (H) of the fluidized bed measured from the top of the grid plate and a top of a fluidized bed.

Statement 15. The gas-phase polymerization system or the process for returning polymer fines to a gas-phase polymerization reactor according to any preceding statement, wherein the reactor entry nozzle of the fines return line is coupled to the fluidized bed reactor at a distance above a top of the grid plate that is at least 50%, at least 55%, at least 60%, at least 65%, at least 70%, at least 75%, at least 80%, at least 85%, or at least 90% of the distance (D) between the top of the grid plate and a top of the reaction zone.

Statement 16. The gas-phase polymerization system or the process for returning polymer fines to a gas-phase polymerization reactor according to any preceding statement, wherein the fines return line has a reactor entry nozzle coupled to the fluidized bed reactor at an angle alpha ($\alpha$)≥10°, ≥15°, ≥20°, ≥25°, ≥30°, ≥35°, ≥40°, ≥45°, ≥50°, ≥55°, or ≥60° relative to a vertical axis of the reaction zone.

Statement 17. The gas-phase polymerization system or the process for returning polymer fines to a gas-phase polymerization reactor according to any preceding statement, wherein the fines return line has a reactor entry nozzle coupled to the fluidized bed reactor at an angle alpha ($\alpha$)≤60°, ≤50°, ≤45°, ≤40°, ≤35°, ≤30°, ≤25°, or ≤20° relative to a vertical axis of the reaction zone.

Statement 18. The gas-phase polymerization system or the process for returning polymer fines to a gas-phase polymerization reactor according to any preceding statement, wherein the fines return line has a reactor entry nozzle coupled to the fluidized bed reactor at an angle beta ($\beta$)≥10°, ≥15°, ≥20°, ≥25°, ≥30°, ≥35°, ≥40°, or ≥45° relative to a vertical plane that includes a vertical axis of the fluidized bed reactor and an entry point of the reactor entry nozzle of the fines return line into the fluidized bed reactor.

Statement 19. The gas-phase polymerization system or the process for returning polymer fines to a gas-phase polymerization reactor according to any preceding statement, wherein the fines return line has a reactor entry nozzle coupled to the fluidized bed reactor at an angle beta ($\beta$)≤60°, ≤50°, ≤45°, ≤40°, ≤35°, ≤30°, ≤25°, or ≤20° relative to a vertical plane that includes a vertical axis of the fluidized bed reactor and an entry point of the reactor entry nozzle of the fines return line into the fluidized bed reactor.

Statement 20. The gas-phase polymerization system or the process for returning polymer fines to a gas-phase polymerization reactor according to any preceding statement, wherein the reactor entry nozzle of the fines return line is coupled to the fluidized bed reactor at a height above a top of the grid plate that is from 55% to 95% of the height (H) of the fluidized bed measured from the top of the grid plate and a top of a fluidized bed.

Statement 21. The gas-phase polymerization system or the process for returning polymer fines to a gas-phase polymerization reactor according to any preceding statement, wherein the reactor entry nozzle of the fines return line is coupled to the fluidized bed reactor at a distance above a top of the grid plate that is from 55% to 95% of the distance (D) between the top of the grid plate and a top of the reaction zone.

Statement 22. The gas-phase polymerization system or the process for returning polymer fines to a gas-phase polymerization reactor according to any preceding statement, wherein the fines return line has a reactor entry nozzle coupled to the fluidized bed reactor at an angle alpha ($\alpha$) from 10° to 60° relative to a vertical axis of the reaction zone.

Statement 23. The gas-phase polymerization system or the process for returning polymer fines to a gas-phase polymerization reactor according to any preceding statement, wherein the fines return line has a reactor entry nozzle coupled to the fluidized bed reactor at an angle beta ($\beta$) from 10° to 60° relative to a vertical plane that includes a vertical axis of the fluidized bed reactor and an entry point of the reactor entry nozzle of the fines return line into the fluidized bed reactor.

Statement 24. The gas-phase polymerization system or the process for returning polymer fines to a gas-phase polymerization reactor according to any preceding statement, wherein the reactor entry nozzle is located at a distance from a top of the fluidized bed that is less than or equal to twice a reaction zone diameter of the fluidized bed reactor.

Statement 25. The gas-phase polymerization system or the process for returning polymer fines to a gas-phase polymerization reactor according to any preceding statement, wherein the reactor entry nozzle is located at a distance from a top of the fluidized bed that is less than or equal to the reaction zone diameter.

Statement 26. The gas-phase polymerization system or the process for returning polymer fines to a gas-phase polymerization reactor according to any preceding statement, wherein the reactor entry nozzle is located at a distance from a top of the fluidized bed that is less than or equal to half the reaction zone diameter.

Statement 27. The gas-phase polymerization system or the process for returning polymer fines to a gas-phase polymerization reactor according to any preceding statement, wherein the reactor entry nozzle is located at a distance from a top of a fluidized bed of the fluidized bed reactor that is greater than or equal to one tenth of the reaction zone diameter.

Statement 28. The gas-phase polymerization system or the process for returning polymer fines to a gas-phase polymerization reactor according to any preceding statement, wherein the distance is greater than or equal to one fifth of the reaction zone diameter.

Statement 29. The gas-phase polymerization system or the process for returning polymer fines to a gas-phase polymerization reactor according to any preceding statement, wherein the reaction zone diameter is an average reaction zone diameter or a maximum reaction zone diameter.

We claim:

1. A gas-phase polymerization system comprising:
a fluidized bed reactor comprising a reactor feed inlet and a fluidizing gas outlet;
a cyclone separator coupled to (and in fluid communication with) the fluidizing gas outlet and configured to receive a fluidizing gas comprising polymer fines and separate the polymer fines from the fluidizing gas;
a venturi eductor coupled between the cyclone separator and the fluidized bed reactor and configured to receive the separated polymer fines from the cyclone separator; and
a fines return line coupling the venturi eductor to the fluidized bed reactor and configured to return the separated polymer fines from the venturi eductor to the fluidized bed reactor;

wherein the fluidized bed reactor further comprises a grid plate above the reactor feed inlet, a reaction zone above the grid plate, and a disengagement zone above the reaction zone and having a larger diameter than the reaction zone;

wherein the fines return line has a reactor entry nozzle coupled to the fluidized bed reactor at a height above a top of the grid plate that is at least 50% of a height (H) of the fluidized bed measured from the top of the grid plate and a top of a fluidized bed; and wherein the following conditions are met:

(a) the reactor entry nozzle of the fines return line is coupled to the fluidized bed reactor at an angle alpha $(\alpha) \geq 5°$ relative to a vertical axis of the reaction zone; or (b) the reactor entry nozzle of the fines return line is coupled to the fluidized bed reactor at an angle beta $(\beta) \geq 5°$ relative to a vertical plane that includes a vertical axis of the fluidized bed reactor and an entry point of the reactor entry nozzle of the fines return line into the fluidized bed reactor; or (c) both conditions (a) and (b) are met.

2. The gas-phase polymerization system according to claim 1, wherein the reactor entry nozzle of the fines return line is coupled to the fluidized bed reactor at a distance above a top of the grid plate that is at least 50% of a distance (D) between the top of the grid plate and a top of the reaction zone.

3. The gas-phase polymerization system according to claim 1, wherein the reactor entry nozzle of the fines return line is coupled to the fluidized bed reactor at a height above a top of the grid plate that is less than or equal to 95% of the height (H) of the fluidized bed measured from the top of the grid plate and a top of a fluidized bed, or less than or equal to 95% of a distance (D) between the top of the grid plate and a top of the reaction zone.

4. The gas-phase polymerization system according to claim 1, wherein the reactor entry nozzle of the fines return line is coupled to the fluidized bed reactor at a height above a top of the grid plate that is at least 70% of the height (H) of the fluidized bed measured from the top of the grid plate and a top of a fluidized bed, or at least 70% of a distance (D) between the top of the grid plate and a top of the reaction zone.

5. The gas-phase polymerization system according to claim 1, wherein the reactor entry nozzle of the fines return line is coupled to the fluidized bed reactor at a height above a top of the grid plate that is at least 85% of the height (H) of the fluidized bed measured from the top of the grid plate and a top of a fluidized bed, or at least 85% of a distance (D) between the top of the grid plate and a top of the reaction zone.

6. The gas-phase polymerization system according to claim 1, wherein the reactor entry nozzle of the fines return line is coupled to the fluidized bed reactor at a height above a top of the grid plate that is from 55% to 95% of the height (H) of the fluidized bed measured from the top of the grid plate and a top of a fluidized bed, or from 55% to 95% of a distance (D) between the top of the grid plate and a top of the reaction zone.

7. The gas-phase polymerization system according to claim 1, wherein the reactor entry nozzle of the fines return line is located at a distance from a top of the fluidized bed that is less than or equal to twice a reaction zone diameter of the fluidized bed reactor, or less than or equal to the reaction zone diameter.

8. The gas-phase polymerization system according to claim 1, wherein the reactor entry nozzle of the fines return line is located at a distance from a top of a fluidized bed of the fluidized bed reactor that is greater than or equal to one tenth of the reaction zone diameter, or greater than or equal to one fifth of the reaction zone diameter.

9. The gas-phase polymerization system according to claim 1, wherein the venturi eductor includes a motive gas inlet, a suction inlet coupled to the cyclone separator, and an eductor discharge outlet coupled to the fluidized bed reactor.

10. The gas-phase polymerization system according to claim 9, further comprising a motive gas supply coupled to the motive gas inlet.

11. The gas-phase polymerization system according to claim 1, wherein the fines return line has a reactor entry nozzle coupled to the fluidized bed reactor at an angle alpha $(\alpha) \geq 25°$ relative to a vertical axis of the reaction zone.

12. The gas-phase polymerization system according to claim 1, wherein the fines return line has a reactor entry nozzle coupled to the fluidized bed reactor at an angle alpha $(\alpha) \geq 45°$ relative to a vertical axis of the reaction zone.

13. The gas-phase polymerization system according to claim 1, wherein the fines return line has a reactor entry nozzle coupled to the fluidized bed reactor at an angle alpha $(\alpha) \leq 60°$ relative to a vertical axis of the reaction zone.

14. The gas-phase polymerization system according to claim 1, wherein the fines return line has a reactor entry nozzle coupled to the fluidized bed reactor at an angle alpha $(\alpha) \leq 45°$ relative to a vertical axis of the reaction zone.

15. The gas-phase polymerization system according to claim 1, wherein the fines return line has a reactor entry nozzle coupled to the fluidized bed reactor at an angle beta $(\beta) \geq 25°$ relative to a vertical plane that includes a vertical axis of the fluidized bed reactor and an entry point of the reactor entry nozzle of the fines return line into the fluidized bed reactor.

16. The gas-phase polymerization system according to claim 1, wherein the fines return line has a reactor entry nozzle coupled to the fluidized bed reactor at an angle beta $(\beta) \geq 45°$ relative to a vertical plane that includes a vertical axis of the fluidized bed reactor and an entry point of the reactor entry nozzle of the fines return line into the fluidized bed reactor.

17. The gas-phase polymerization system according to claim 1, wherein the fines return line has a reactor entry nozzle coupled to the fluidized bed reactor at an angle beta $(\beta) \leq 60°$ relative to a vertical plane that includes a vertical axis of the fluidized bed reactor and an entry point of the reactor entry nozzle of the fines return line into the fluidized bed reactor.

18. The gas-phase polymerization system according to claim 1, wherein the fines return line has a reactor entry nozzle coupled to the fluidized bed reactor at an angle alpha $(\alpha)$ from 10° to 60° relative to a vertical axis of the reaction zone.

19. The gas-phase polymerization system according to claim 1, wherein the fines return line has a reactor entry nozzle coupled to the fluidized bed reactor at an angle beta $(\beta)$ from 10° to 60° relative to a vertical plane that includes a vertical axis of the fluidized bed reactor and an entry point of the reactor entry nozzle of the fines return line into the fluidized bed reactor.

20. The gas-phase polymerization system according to claim 1, wherein only condition (a) is met such that the reactor entry nozzle of the fines return line is coupled to the fluidized bed reactor at an angle alpha $(\alpha) \geq 5°$ relative to a vertical axis of the reaction zone; and the reactor entry nozzle of the fines return line is coupled to the fluidized bed reactor at an angle beta ($\beta$)=0° relative to a vertical plane that includes a vertical axis of the fluidized bed reactor and an entry point of the reactor entry nozzle of the fines return line into the fluidized bed reactor.

\* \* \* \* \*